Patented Nov. 24, 1953

2,660,582

UNITED STATES PATENT OFFICE 2,660,582

QUATERNARY NICOTINIC ACID AMIDE DERIVATIVES AND PRODUCTION THEREOF

Hans Suter, Dorflingen, Fritz Stocker, Feuerthalen, and Hans Zutter, Schaffhausen, Switzerland, assignors to Cilag Limited, Schaffhausen, Switzerland, a company of Switzerland No Drawing. Application June 30, 1950,
Serial No. 171,538

1 Claim. (Cl. 260—295.5)

This invention relates to novel quaternary nicotinic acid amide derivatives and to the production thereof.

We have found that the N-hydroxymethyl amide of nicotinic acid has an excellent curative effect on infections of the bile duct and the intestinal tract.

We have now found that by quaternising of the cyclic nitrogen atom of N-hydroxymethyl-nicotinic acid amide the effectiveness of this compound may be increased. The present invention accordingly provides a series of new therapeutically valuable compounds of the general formula:

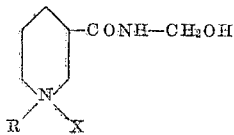

wherein R is selected from the group comprising alkyl groups, carboxyalkyl groups, carbalkoxyalkyl groups, carbamidoalkyl groups, sulphonic acid alkyl groups, and phosphonic acid alkyl groups containing a maximum of 20 carbon atoms and X is selected from the group comprising halogen atoms, alkylsulphonate groups and alkoxysulphonate groups containing a maximum of 6 carbon atoms.

As already mentioned, these alcohols possess excellent germicidal properties and are intended for use as chemotherapeutics and as intermediate products.

The present invention also provides two suitable processes for production of the new compounds of the above mentioned formula. According to the first of these processes formaldehyde is reacted with compounds of the general formula

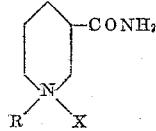

in which R and X have the above defined meanings. Formaldehyde may also be used in the form of its polymers, trimers and acetals. The two starting materials are preferably reacted together in a solvent.

According to the second process for the production of the new compounds, N-hydroxymethyl-nicotinic acid amide is reacted with compounds of the formula

R—X wherein R represents an alkyl group, carboxyalkyl group, carbalkoxyalkyl group, a carbamidoalkyl group, a sulphonic acid alkyl group or a phosphonic acid alkyl group containing at most 20 carbon atoms and X a halogen atom, an alkylsulphonate group or an alkoxysulphonate group containing at most 6 carbon atoms. The reaction may be carried out in the presence or absence of solvents.

The following examples show how the process of the invention may be carried into effect.

*Example 1.*—16 gms. of $N_1$-chlormethyl-nicotinic acid amide were suspended in 200 cc. of ethanol and 10 cc. of a neutralised 35% formaldehyde solution were added. The mixture was heated for an hour on the water bath and then allowed to cool. The hot solution was clear but on cooling and addition of acetone colourless crystals separated which were again recrystallised from ethanol-acetone. $N_1$-chlormethyl-N-hydroxymethyl-nicotinic acid amide was thus obtained in fine crystal clusters with a melting point of 160–161° C.

14 gms. of the product were obtained corresponding to 69% of the theoretical yield. The compound is quite soluble in water and alcohol and sparingly soluble in ether, acetone and dioxane.

*Example 2.*—43.7 gms. of N-hydroxymethyl-nicotinic acid amide were suspended in 500 cc. of dioxane and shaken in an autoclave for 25 hours with 60 gms. of methyl chloride at 100–120° C.

After cooling the mass crystallised out from the solution and was sucked off and washed with dioxane and ether. After recrystallisation from alcohol-acetone 45.1 gms. of $N_1$-chlormethyl-N-hydroxymethyl-nicotinic acid amide was obtained having a melting point of 160–161° C., the yield amounting to 78% of the theoretical. The new compound is quite soluble in water and alcohol but sparingly soluble in ether, acetone and dioxane.

*Example 3.*—11.2 cc. of neutralised 40% formaldehyde solution were added to a suspension of 35 gms. of $N_1$-bromcetyl-nicotinic acid amide in 200 cc. of ethanol. The mixture was heated to 30° C. and a solution was formed in a short time. After standing for half-an-hour at 30° C. the solution was allowed to cool whereupon 25 gms. of $N_1$ - bromcetyl - N-hydroxymethyl-nicotinic acid amide crystallised out. The amide could easily be purified by recrystallisation from alcohol. It melts at 219–220° C. with decomposition and is readily soluble in hot water and in the usual organic solvents on heating.

Example 4.—50 gms. of $N_1$-methanesulphonate-octyl-nicotinic acid amide of a melting point of 129–130° C. were dissolved with 12 cc. of a neutralised 39% formaldehyde solution in 500 cc. of ethanol and heated for an hour to 60° C. The solution was then evaporated to dryness in vacuo at 30° C. The slightly yellowish crystalline residue was dissolved in absolute ethanol, the solution was treated with charcoal and the filtrate precipitated with ether. $N_1$-methanesulphonate - octyl - N - hydroxymethyl-nicotinic acid amide was obtained in fine white crystals which melt at 98° C. The yield was 32.5 gms. corresponding to 59% of the theoretical yield. The new compound is readily soluble in water, ethanol and chloroform, it is insoluble in ether, petroleum ether and benzene.

Example 5.—15 gms. of N-hydroxymethyl-nicotinic acid amide were added to a solution of 30 gms. of methanesulphonic acid octyl ester in 150 cc. of dioxane and heated with stirring to 100° C. for 12 hours. The solution was then evaporated in vacuo at 30° C. to a thick consistency and then extracted several times with petroleum ether in order to remove the excess of methanesulphonic acid octyl ester. The residue falls apart to a powdery mass which could readily be reprecipitated with ether from absolute ethanol. 22 gms. of $N_1$-methanesulphonate-octyl-N-hydroxy-methyl-nicotinic acid amide were thus obtained as colourless crystals melting at 98° C. The yield corresponds to 61% of the theoretical yield. The new compound is readily soluble in water, ethanol and chloroform, it is insoluble in ether, petroleum ether and benzene.

Example 6.—22 gms. of $N_1$-chlor-carboxymethyl-nicotinic acid amide (produced in a manner analogous to that described in Berichte 23 2608) were suspended with 11 cc. of a neutralised formaldehyde solution in 200 cc. of ethanol. The whole was heated for an hour to 50° C. and then allowed to cool slowly. Acetone was carefully added and the mixture placed in a cooling cupboard as soon as crystallisation began. After several days 18.3 gms. of $N_1$-chlor-carboxy-methyl-N-hydroxymethyl-nicotinic acid amide had separated, which melts at 120° C. with decomposition. The yield corresponds to 73% of the theoretical yield. The new compound is readily soluble in water and methanol, and is less soluble in acetone, ether and acetic ester.

Example 7.—22 gms. of N-hydroxymethyl-nicotinic acid amide were intimately mixed with 23.6 gms. of chloracetic acid and carefully heated to 100° C. The mixture melted within 30 minutes to a clear mass, the melt was then cooled, pulverised, dissolved in ethanol and precipitated with acetone. 41 gms. of $N_1$-chlor-carboxymethyl-N-hydroxymethyl-nicotinic acid amide were obtained which melts with decomposition at 120° C. The new compound is readily soluble in water and methanol and is less soluble in acetone, ether and acetic ester.

Example 8.—22 gms. of $N_1$-chlor-carbamidomethyl-nicotinic acid amide were heated for one hour to 40° C. with 10 cc. of 40% neutralised formaldehyde solution in 200 cc. of ethanol. After cooling acetone was added drop by drop to the solution until crystallisation began and the solution was then placed in ice. After some time 19.8 gms. of $N_1$-chlorcarbamido-methyl-N-hydroxymethyl-nicotinic acid amide had crystallised out, which melts at 125° C. with decomposition. The yield corresponds to 80% of the theoretical yield. The new compound is moderately soluble in water, readily soluble in ethanol and methanol, and only sparingly soluble in acetone.

Example 9.—38 gms. of N-hydroxymethyl-nicotinic acid amide were well mixed with 24 gms. of chloracetamide and cautiously heated to 105° C. The mass fused with evolution of heat. After approximately 30 minutes the melt had become homogeneous. It was then cooled, pulverised and recrystallised from ethanol/acetone. In this way 52 gms. of $N_1$-chlorcarbamidomethyl-N-hydroxymethyl-nicotinic acid amide were obtained melting at 126° C. with decomposition. The yield corresponds to 84% of the theoretical yield. The new compound is moderately soluble in water, readily soluble in ethanol and methanol and only very sparingly soluble in acetone.

Example 10.—50 gms. of N-hydroxymethyl-nicotinic acid amide were heated with 600 cc. of dioxane and 120 gms. of n-cetyl bromide in the autoclave for 31 hours at 100–110° C. After cooling the solvent was decanted and the partially crystalline residue was recrystallised from ethanol/acetic ester. 122 gms. of $N_1$-bromcetyl-N-hydroxymethyl-nicotinic acid amide were obtained corresponding to a yield of 78.9% of the theoretical. The new compound melts at 219–220° C. and is readily soluble in the heat in the usual organic solvents. It can be purified well by recrystallisation from ethanol.

Example 11.—50 gms. N-hydroxymethyl-nicotinic acid amide were heated with 98.4 gms. n-lauryl bromide and 600 cc. of dioxane to 100–110° C. for 30 hours in a shaking autoclave. After cooling the crystalline product was sucked off, washed with a little dioxane and then recrystallised from ethanol/acetic ester. 91 gms. of $N_1$-bromdodecyl - N - hydroxymethyl - nicotinic acid amide were obtained corresponding to a yield of 68.5% of the theoretical. The new compound melts at 140–145° C. and is readily soluble in ethanol, hot water and hot dioxane and is insoluble in acetic ester, ether and acetone.

The following compounds can be obtained in analogous manner by the action of formaldehyde:

(a) $N_1$-chlor - phosphonic - acid - methyl-N-hydroxymethyl-nicotinic acid amide from $N_1$-chlor-phosphonic-acid-methyl-nicotinic acid amide.

(b) $N_1$ - chlor - sulphonic - acid - methyl - N-hydroxymethyl-nicotinic acid amide from $N_1$-chlor-sulphonic-acid-methyl-nicotinic acid amide.

(c) $N_1$ - methane - sulphonate - ethyl - N- hydroxymethyl-nicotinic acid amide from $N_1$-methane-sulphonate-ethyl-nicotinic acid amide.

(d) $N_1$-methoxy - sulphonate - methyl - N-hydroxymethyl-nicotinic acid amide from $N_1$-methoxysulphonate-methyl-nicotinic acid amide.

The four above-mentioned compounds can also be prepared from N-hydroxymethyl-nicotinic acid amide and the following components:

(a) Chlormethyl - phosphonic acid (Helv. 32S.1175–86 (1949)).

(b) Chlormethyl-sulphonic acid.

(c) Methane-sulphonic acid ethyl ester.

(d) Dimethyl-sulphate.

We claim:
The new chemical compound N₁-bromcetyl-N-hydroxymethyl-nicotinic acid amide of the formula:

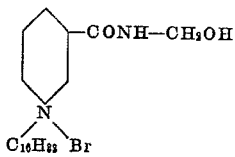

HANS SUTER.
FRITZ STOCKER.
HANS ZUTTER.

References Cited in the file of this patent

UNITED STATES PATENTS

| Number | Name | Date |
|---|---|---|
| 2,304,830 | Katzman | Dec. 15, 1942 |

FOREIGN PATENTS

| Number | Country | Date |
|---|---|---|
| 203,947 | Switzerland | 1939 |

OTHER REFERENCES

Graf Chemical Abstracts, vol. 28 (1934), p. 769 (Briefing), J. Prakt. Chem. 138 (1933), pp. 294, 295.

Hunt, J. of Pharm. and Exp. Therap 37 (2).

Wiegand, Nature, October 23, 1948, p. 659.